July 10, 1928.
R. E. CHAPMAN
APPARATUS FOR PACKING JOINTS
Filed March 24, 1923
1,676,425
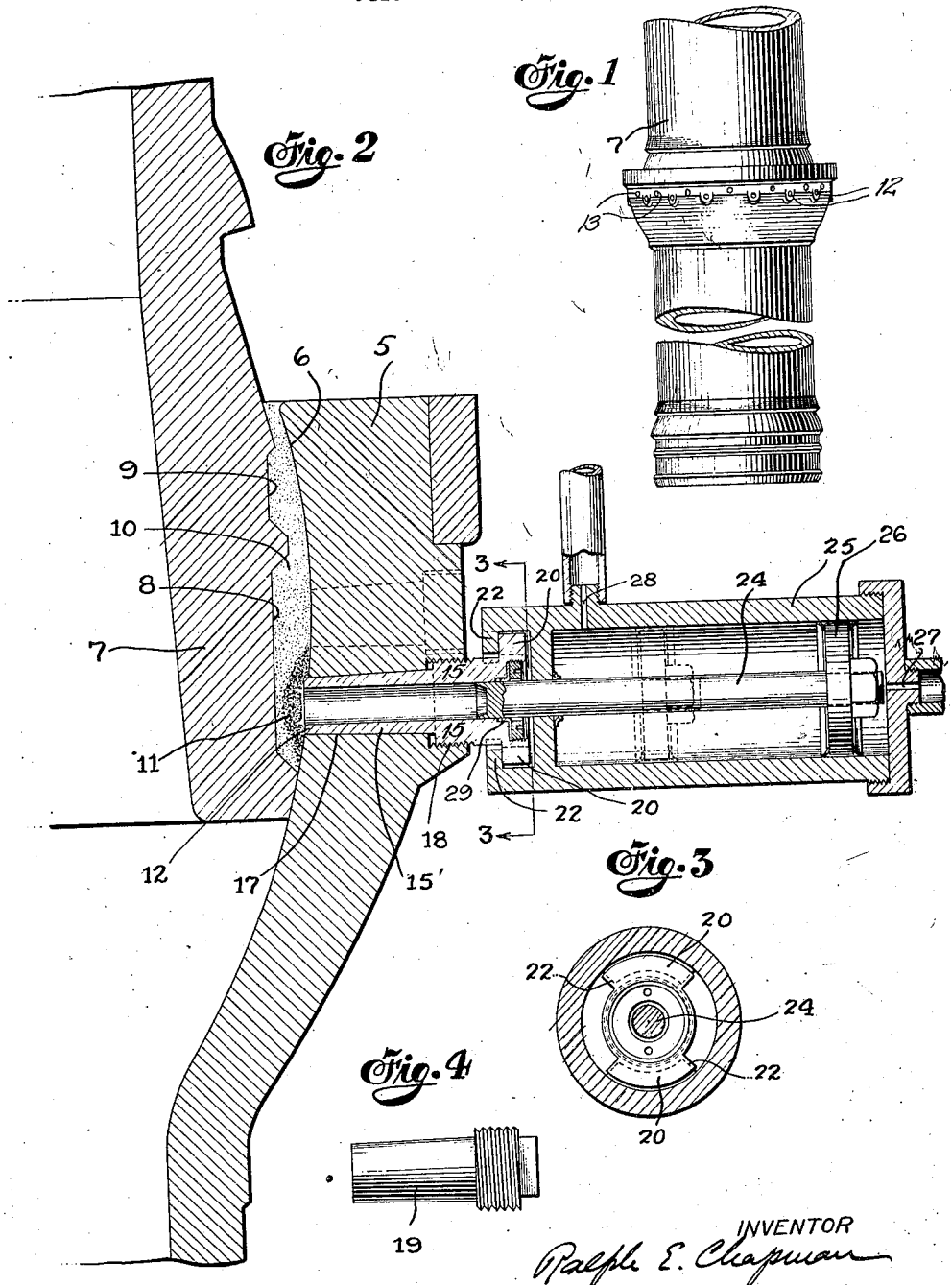

Patented July 10, 1928.

1,676,425

UNITED STATES PATENT OFFICE.

RALPH E. CHAPMAN, OF BROOKLYN, NEW YORK.

APPARATUS FOR PACKING JOINTS.

Application filed March 24, 1923. Serial No. 627,510.

The present invention relates generally to the packing of joints and particularly to apparatus for forcing a metallic packing such as lead into the packing space between adjacent pipe sections; the object of the invention being to provide improved apparatus for this purpose which will enable such a joint to be packed rapidly and under such high pressure as to secure a perfect fluid tight joint.

The invention may be conveniently illustrated and described in connection with the flexibly jointed bell and spigot type of pipe which is made by providing the bell flange with an interior surface corresponding to a segment of a sphere and a spigot end for insertion therein so that when adjacent sections are placed together the spigot end will extend into the bell end leaving a space to be filled with a suitable packing material such as lead which is attached to the spigot end and forms a segment of a sphere contacting with the interior surface of the bell.

It has been proposed to pack joints of this character with lead and in the case of joints of pipes of large diameter, to introduce a part of the packing material in molten condition and then force additional material into the joint under sufficiently high pressure to cause the metal to flow to compensate for shrinkage and insure a tight joint. Heretofore packing has been forced into the joint by means of screws or screw bolts threaded into holes through the outer or bell flange member of the pipe joint. This packing process has been slow inasmuch as it involves the repeated turning in and out of the screws. Moreover the screws often break and have to be drilled out thus causing additional delay.

The nature and objects of the invention will be more clearly understood from a description of a selected embodiment thereof for the purposes of which description reference should be had to the accompanying drawings wherein—

Figure 1 is a plan view of a section of pipe as laid.

Figure 2 is a sectional view of the pipe joint showing connected thereto apparatus for forcing lead into the joint, such apparatus being constructed in accordance with and embodying the principles of the invention.

Figure 3 is a sectional view taken on the line 3—3 Figure 2.

Figure 4 is a view in elevation of a suitable plug designed to be used for permanently plugging the holes after the packing of the joint has been completed.

The drawings show a pipe joint formed between a bell flange 5 having an interior spherical surface 6 and a spigot 7 fitting therein and provided with grooves 8, 9 for receiving the packing material, together with apparatus for forcing packing material into the joint connected in operative relation to the bell flange. It is contemplated that ordinarily a part of the packing 10 such as lead will be cast in the joint as by pouring it while in molten condition and that the rest of the packing will be forced into the joint forming a dense compact mass extending annularly around the joint as indicated at 11. In the structure illustrated two rows of holes 12, 13 are provided in the bell flange and through these holes the packing is forced into the joint.

Means are provided for holding the packing apparatus, hereinafter described, in operative relation with the pipe the said means herein taking the form of a nipple 15 which may be screwed into the flange at any one of the holes. The nipple shown not only constitutes means for the attachment of the packing apparatus but may be furnished with an extension or bushing 15′ having a smooth bore to form a cylinder in which the plunger of the packing apparatus may operate if the hole in the pipe is not adapted to act as such a cylinder. If it is desired to arrange the plunger so that it will pass through the bell flange the part of the nipple which acts as a cylinder for the plunger may be located within the flange as herein shown. One such nipple may be used and moved from hole to hole as the packing proceeds or a series of nipples, one for each hole may be provided as convenience may require.

When nipples of the character herein shown are used the holes in the flange 5 are preferably tapered as at 17 for a portion of their length and threaded as at 18 to provide for the attachment of the nipple and ultimately for attachment of the plugs 19 which permanently close the holes when the packing operation is completed. The extension 15′ of the nipple is correspondingly tapered and formed with a sufficient number of threads to insure the desired connection to the bell flange.

In case the nipple as illustrated is used it is provided at its outer end with a flange to which the packing apparatus is attachable, preferably removably. As shown attachment is provided by forming the nipple flange with two opposite segments 20, 20, and the packing apparatus with inturned hooks or segmental flanges 22, 22 adapted to be engaged behind the segmental flanges of the nipple. By this arrangement the packing apparatus is easily connected to and disconnected from the nipple so that slugs of lead or other packing material may be inserted in the cylinder within the nipple.

The packing apparatus includes a plunger 24 of relatively small diameter for forcing the lead or other packing into the joint. As shown herein this plunger is adapted to cooperate with the cylinder formed in the nipple 15. The end of the plunger is preferably cup shaped providing a relatively thin edge which tends to hug the walls of the cooperating cylinder however the latter may be formed. Means for driving or jacking the plunger with sufficient power to force the lead or other packing material into the joint are furnished and are herein shown as a hydraulic apparatus comprising a cylinder casing 25 containing a piston 26 attached directly to the outer end of the plunger 24. Ports 27 and 28 in the head and side of the cylinder respectively are connected by pipes with a suitable valve mechanism, not shown, by which water or other fluid under pressure may be admitted to or withdrawn from the cylinder casing.

The length and stroke of the plunger are preferably such that it will project slightly into the nipple when in its retracted position and into the body of the packing beyond the inner surface of the bell flange when in its projected position. As shown the plunger is formed with a relatively close fit in the bore of the nipple and also a packing 29 is provided to insure a fluid tight connection between the nipple and plunger. If the plunger fits sufficiently close in its cooperating cylinder the packing may of course be omitted. The use of packing, however, is preferred if the piston is made substantially smaller than the bore as may be desirable to prevent binding due to inaccuracy in the alignment of the nipple and plunger.

In operation a nipple may be introduced into each hole, a slug of lead or other packing inserted and the packing apparatus then connected to the nipple flanges successively and operated to force the lead into the joint. Several slugs may be successively introduced into each hole until the joint is sufficiently packed. Preferably after the joint is made tight a slug of lubricant is similarly introduced into each hole and forced into the joint to lubricate the joint and provide in the joint a water repellant and rust preventing element. The nipple or nipples are then removed and plugs 19 inserted to close the holes.

The description of the particular apparatus shown is illustrative merely and is not intended as defining the limits of the invention.

I claim:

1. In apparatus for packing pipe joints in combination a nipple having its exterior tapered and threaded for a portion of its length to fit a correspondingly tapered and threaded hole in a pipe flange, said nipple having at its outer end a segmental flange, a plunger operable in the bore of the nipple to force packing into the joint, and plunger actuating means having hooks removably attachable to said segmental flange of the nipple.

2. As an article of manufacture, a nipple tapered for a portion of its length and threaded for a portion of its length having a smooth bore adapted to receive a plunger, said nipple having at its outer end a segmental flange for attachment to plunger actuating means.

In testimony whereof, I have signed my name to this specification this 20th day of March, 1923.

RALPH E. CHAPMAN.